United States Patent
Chang (10) Patent No.: US 8,134,749 B2
(45) Date of Patent: Mar. 13, 2012

(54) MULTI-BIT-DEPTH ERROR DIFFUSION FOR THE REPRODUCTION OF COLOR OR MONOCHROME IMAGES

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 661 days.

(21) Appl. No.: 11/754,260

(22) Filed: May 25, 2007

(65) Prior Publication Data

US 2008/0291499 A1 Nov. 27, 2008

(51) Int. Cl.
*H04N 1/405* (2006.01)
(52) U.S. Cl. ....... 358/3.05; 358/3.03; 358/1.9; 358/3.14
(58) Field of Classification Search .................. 358/1.9, 358/2.1, 3.03–3.06, 3.13–3.14, 3.16, 3.2
See application file for complete search history.

(56) References Cited

U.S. PATENT DOCUMENTS

| | | | | |
|---|---|---|---|---|
| 5,268,774 A | * | 12/1993 | Eschbach | 358/466 |
| 5,661,570 A | * | 8/1997 | Nomura | 358/3.01 |
| 5,739,917 A | * | 4/1998 | Shu et al. | 358/2.1 |
| 6,292,268 B1 | * | 9/2001 | Hirota et al. | 358/3.03 |
| 7,417,771 B2 | * | 8/2008 | Chang | 358/3.03 |
| 2002/0196484 A1 | * | 12/2002 | Chang | 358/534 |

FOREIGN PATENT DOCUMENTS

JP 2002077608 3/2002

* cited by examiner

*Primary Examiner* — Thomas D Lee
*Assistant Examiner* — Stephen M Brinich
(74) *Attorney, Agent, or Firm* — Stolowitz Ford Cowger LLP (57) ABSTRACT

An image processing system including a lookup table having multi-bit printer output levels and an imaging input level. The imaging input level may be associated with a range of input pixel densities. The system further includes a processor configured to compare the imaging input level with one or more preconfigured threshold output values associated with the printer output levels. The imaging input level may be preferentially weighted to select a printer output level having an increased bit depth.

24 Claims, 7 Drawing Sheets

FIG. 1A

INPUT  OUTPUT

PRIOR ART

FIG. 1B

INPUT  OUTPUT

PRIOR ART

FIG. 1C

INPUT          OUTPUT

PRIOR ART

| INPUT COLOR | INPUT LEVEL | | OUTPUT THRESHOLD | OUTPUT LEVEL | OUTPUT COLOR |
|---|---|---|---|---|---|
| 96-255 | IN-9 | | 127 | OUT-15 | 255 |
| | | | 119 | OUT-14 | 238 |
| | | | 111 | OUT-13 | 221 |
| | | | 103 | OUT-12 | 204 |
| | | | 95 | OUT-11 | 187 |
| | | | 87 | OUT-10 | 170 |
| | | | 79 | OUT-9 | 153 |
| 88-95 | IN-8 | | 69 | OUT-8 | 136 |
| 80-87 | IN-7 | | 59 | OUT-7 | 119 |
| 72-79 | IN-6 | | NONE | OUT-6 | 102 |
| 64-71 | IN-5 | | NONE | OUT-5 | 85 |
| 56-63 | IN-4 | | NONE | OUT-4 | 68 |
| 48-55 | IN-3 | | NONE | OUT-3 | 51 |
| 40-47 | IN-2 | | NONE | OUT-2 | 34 |
| 1-39 | IN-1 | | NONE | OUT-1 | 17 |
| | | | NONE | OUT-0 | 0 |

FIG. 4

INPUT      OUTPUT

FIG. 5

INPUT → OUTPUT

FIG. 6

INPUT → OUTPUT

MULTI-BIT-DEPTH ERROR DIFFUSION FOR THE REPRODUCTION OF COLOR OR MONOCHROME IMAGES

TECHNICAL FIELD

The invention relates to the reproduction of color or monochrome images using multi-bit depth error diffusion.

BACKGROUND

In reproducing color or monochrome images, conventional printers are typically able to reproduce an input color or tone as one of a finite number of grey levels. An Electro-Photography (EP) printer, for example, may be used to represent the available number of grey levels. Some printer systems utilize an error diffusion algorithm to improve a reproduced image quality. However, such systems known in the art suffer from multiple problems, such as those identified in FIGS. 1A-C.

Figure 1A:
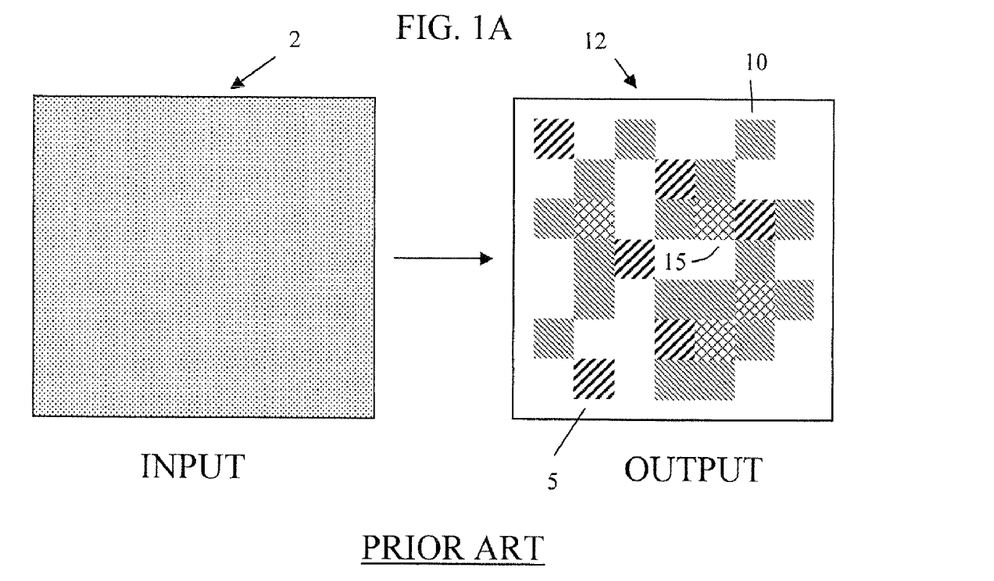
FIG. 1A illustrates a method of image reproduction, known in the art.

In FIG. 1A a conventional system for reproducing images identifies an input color that may be classified as having a dark tone 2. The system reproduces the dark tone 2 as output color 12. Output color 12 includes a combination of dark tone pixels 5 and light tone pixels 10 that are generated in an attempt to reproduce the dark tone 2. The combination of multiple tone pixels results in an unpleasant patterning that appears irregular or non-uniform in tonal quality. In addition, dot gain 15 appears in regions of pixel groupings, as ink is attracted from neighboring pixels, of either light or dark tone 5, 10.

Figure 1B:
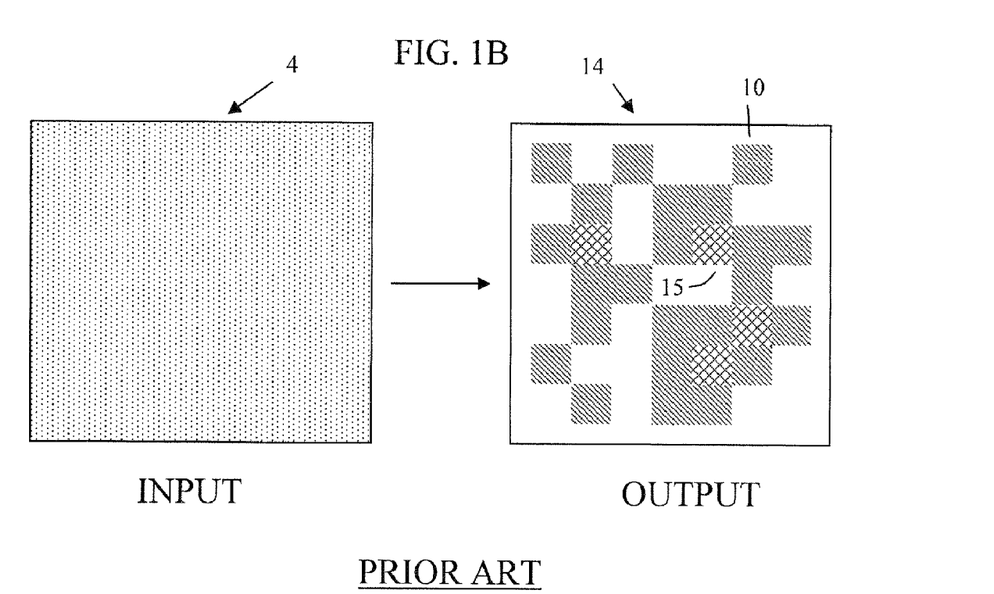
FIG. 1B illustrates a method of image reproduction favoring low density level pixels.

In FIG. 1B a conventional printer system identifies an input color that may be classified as having a mid-tone 4. The system reproduces the mid-tone 4 as output color 14, including many light tone pixels 10. Light toned pixels 10 are preferentially selected by conventional error diffusion algorithms, such that the mid-tone 4 is reproduced using a relatively large number of light tone pixels 10. As in FIG. 1A, the relatively large number of pixels results in dot gain 15.

Figure 1C:
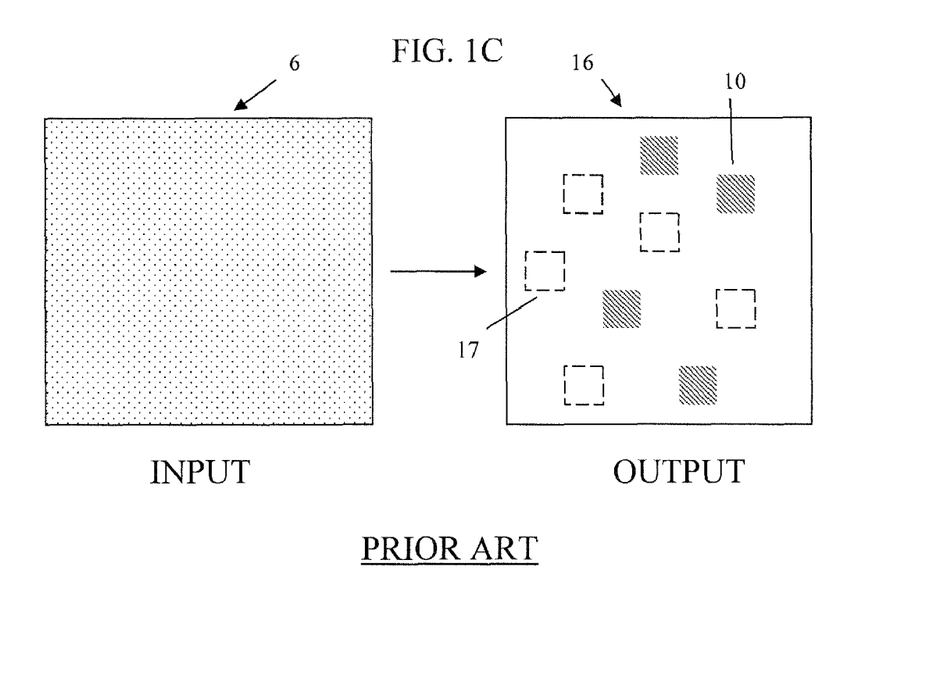
FIG. 1C illustrates a method of image reproduction having unstable pixels.

In FIG. 1C a conventional printer system identifies an input color that may be classified as having a light tone 6. The system reproduces the light tone 6 as output color 16, including relatively few, isolated light tone pixels 10. Because of physical limitations of conventional printers, dies, and print media, some of the isolated light tone pixels identified as empty pixels 17, do not adhere to the print media and are wiped away or dispersed during the printing process.

The present invention addresses these and other problems.

SUMMARY OF THE INVENTION

An image processing system is herein disclosed as including a lookup table having multi-bit printer output levels and an imaging input level. The imaging input level may be associated with a range of input pixel densities or color levels. The system further includes a processor configured to compare the imaging input level with one or more preconfigured threshold output values associated with the printer output levels. The imaging input level may be preferentially weighted to select a printer output level having an increased bit depth.

A method of image reproduction is herein disclosed as including an assignment of a non-uniform range of image pixel densities to an input level in a lookup table, an assignment of the input level with one or more multi-bit output levels representing a print density, and an assignment of a threshold value to each of the one or more multi-bit output levels. The method further include a reproduction of the image that results in a preferential selection of one of the multi-bit output levels having a greater print density than the image pixel density. The selection of the output level may be made according to a comparison of the input level with the threshold value.

Logic is herein disclosed as being encoded in one or more tangible media for execution, and when executed, operable to determine an image input level and associate the image input level with one or more threshold output values which identify multi-bit output levels. The logic encoded in one or more tangible media may further be operable to adjust the image input level by error diffusion, compare the adjusted image input level with the one or more threshold output levels, and select an output level. At least one of the multi-bit output levels may not identified by any of the one or more threshold output levels.

The invention will become more readily apparent from the following detailed description of a preferred embodiment of the invention which proceeds with reference to the accompanying drawings.

DESCRIPTION OF EXAMPLE EMBODIMENTS

Improved image quality can be achieved by means of error diffusion algorithms. Error diffusion puts down an ink pixel on a device space pixel position, or leaves it blank based on a thresholding result in an accumulated current pixel color value. A difference of color value may be stored in an error buffer and be used to affect one or more neighboring pixels. Weights of color values applied to neighboring pixel positions may be based on a two dimensional arrangement provided in an error filter. Multi-level error diffusion can sometimes result in a preferential selection of a light tone pixel where an output color is selected according to a sequential evaluation of possible output colors against the input color. One such algorithm for a 2-bit error diffusion thresholding process is provided as follows:

```
if (color_value > threshold_A)
    pixel = level_3
else if (color_value > threshold_B)
    pixel = level_2
else if (color_value > threshold_C)
    pixel = level_1
else pixel = 0
```

Accordingly, the possibility of each level 1, 2 or 3 being selected is related as level_1>>level_2>>level_3. A lower density level pixel selection including level 1 is favored by this algorithm, as any accumulated error tends to be used in the selection of the lower level pixel densities, such as level 1 or level 2, and before the adjusted color value can exceed the threshold value associated with the highest pixel density, such as level 3 in the above embodiment. This may result in an uneven patterning or unstable pixels, for example.

A conventional multi-bit depth error diffusion algorithm may be applied to an Electro-Photography (EP) printer. Multi-bit depth error diffusion is able to utilize 2-bits, 4-bits or even 8-bits of data to represent an input color. Whereas it may be expected that the reproduced image using the multi-bit error diffusion algorithm would be improved compared to a bi-tonal error diffusion algorithm, the opposite is evidenced by experimentation in certain conditions. Multi-bit depth error diffusion operates to distribute a processing error through neighboring pixels, for example, however this can result in a range of bit depths in neighboring pixels which also results in an uneven pattern or irregular tonal quality. These results may occur for applications related to an EP printer, as well as other printer systems known in the art.

Figure 2:
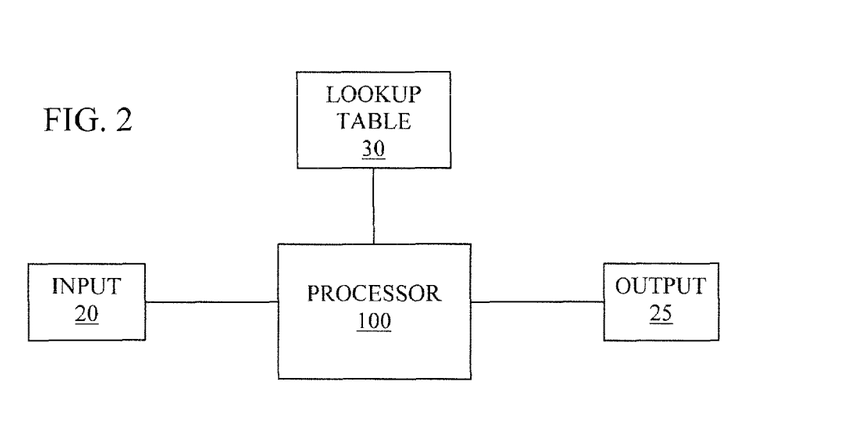
FIG. 2 illustrates an example block diagram of an improved image reproduction system including a novel lookup table.

FIG. 2 illustrates an example block diagram of an improved image reproduction system including an image processor 100 and a novel lookup table 30. The processor 100 may be included as part of a computer system with a monitor, printer, scanner, or other peripheral device. In one embodiment, the processor 100 is integral with a printer, scanner or other graphic device.

The lookup table 30 may be provided in a database, server, or by one or more arrays of data that is accessible by the processor 100. The processor 100 may be configured to compare an input color 20 with one or more output levels. The lookup table 30 may include multi-bit printer output levels and multiple imaging input levels where the input color 20 or one of the input levels is associated with a range of input pixel densities or input color values. An input color 20 representing a dark tone may be associated with a different magnitude or range of input pixel densities than an input color 20 representing a light tone. The processor 100 may access the lookup table 30 to select or determine an output color 25 to reproduce the input color 20.

Figure 3:
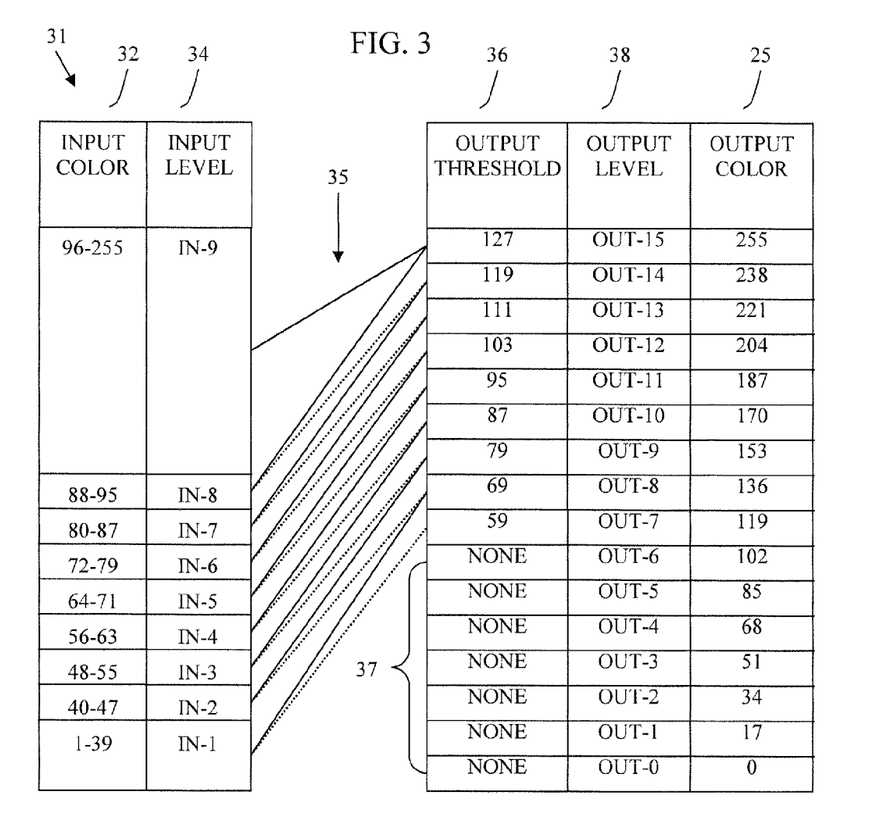
FIG. 3 illustrates an abstract representation of a novel lookup table.

FIG. 3 illustrates a simplified example of a novel lookup table 31, which may be used as lookup table 30 of FIG. 2. The lookup table 31 is shown as including an input color range 32, an input level 34, an output threshold 36, an output level 38 and the output color 25 of FIG. 2. In one embodiment, the input color 20 of FIG. 2 may be compared with the input color range 32 of the lookup table 31 in order to determine an associated input level 34. The input color range 32 may identify a range of image or input pixel densities. The input level 34 may be associated with or compared to the output threshold 36. The output threshold 36 may include a minimum threshold value. The output threshold 36 may be associated with the output level 38 or the output color 25. By using the lookup table 31, a processor, such as processor 100 of FIG. 2 may be configured to compare the input level 34 with one or more threshold values associated with output color 25. Output color 25 may include a printer output level associated with a multi-bit depth pixel density.

Lookup table 31 includes example values and associations between multiple input and output fields. The input and output values and associations are provided as one of many possible examples contemplated herein. For example, input color range 32 and output color 25 may be defined as an 8-bit data representation of tone or grey level. Of course other multi-bit representations may also be used in addition to or in place of 8-bits, for example 2-bits and 4-bits of data.

According to an 8-bit data representation of tone, a maximum range may be provided as including a maximum input color of 255, or 100% pixel density. FIG. 3 shows the maximum range as including input color from 96 to 255. Subsequent ranges are illustrated as including 8-bit data representations of 88-95, 80-87, 72-79, 64-71, 56-63, 48-55, 40-47 and 1-39. A pixel density of 1 indicates the lowest pixel density that may be identified by an 8-bit data representation of tone.

Input level 34 is shown as being represented by a maximum input level IN-9 shown associated with the maximum input color range 32 of 96-255. Subsequent input levels are identified as IN-8, IN-7, IN-6, IN-5, IN-4, IN-3, IN-2 and IN-1 that correspond with the same number of input color ranges 32 discussed above. For example, the lowest input level IN-1 corresponds with the lowest input color range of 1-39. The input color range 32 is illustrated as including an irregular distribution of pixel densities, such that the largest input level IN-9 is associated with the largest range of pixel densities or input colors. The input color ranges 32 and corresponding input levels 34 may be configured or preconfigured according to user preference or printer specifications for example.

Output level 38 is shown as being represented by a 4-bit data values ranging from OUT-0 to OUT-15, with OUT-15 representing a maximum output pixel density, or 100% print density, and OUT-0 representing zero output pixel density, or 0% print density. Output color OUT-1 indicates the lowest output pixel density that may be identified for tone.

The output level 38 may be associated with the output threshold 36. In one embodiment, any of the output levels OUT-7 to OUT-15 may correspond to an output threshold 36 and an output color 25. Output level OUT-15 is shown as corresponding with a threshold value of 127 and an output color of 255, whereas output level OUT-14 is shown as corresponding with a threshold value of 119 and an output color of 238. Output color OUT-7 is shown as corresponding to a threshold value of 59 and an output color of 119, whereas the output levels OUT-0 to OUT-6 are shown as not including any corresponding threshold value, having an output color range identified as NONE. In one embodiment, output levels 38 or output colors 25 which are identified as not corresponding to an output threshold 36 are excluded from color selection or consideration for image representation. Other embodiments may identify more or fewer output levels than OUT-0 to OUT-6 that do not correspond to any input levels. A print density that may be assigned to a single pixel may be dependent on a particular print engine, printing system, print medium, or user preference for example.

The input levels 34 are shown as being associated with the output levels 38, including output thresholds 36 and output colors 25, according to color selection associations 35. As illustrated, input level IN-9 may be associated with output level OUT-15 and output color 255. Input level IN-8 may be associated with output level OUT-14 and output color 238. Input level IN-7 may be associated with output level OUT-13 and output color 221, etc. Each of the input levels 34 may be associated with one or more of the output levels 38, as well as the corresponding output thresholds 36 and output colors 25.

In one embodiment, some of the input levels 34 are associated with exactly two output levels 38 or output colors 25. For example, input level IN-8 may be associated with both output level OUT-15 and OUT-14, also associated with output colors 255 and 238, respectively. Input level IN-7 may be associated with both output color OUT-14 and OUT-13, also associated with output colors 238 and 221, respectively. In this manner, sequential or adjacent input levels, such as IN-7 and IN-8 may include overlapping associations with the same output level or output color, such as OUT-14 and output color 238. Whereas each of the input levels IN-1 through IN-8 are shown as being associated with two output levels or two output colors, the largest input level IN-9 is shown as being associated with only one output level OUT-15, representing the largest output color 255, or maximum print density. Of course, in some embodiments, a different maximum or largest output color may be represented by output level OUT-15, such as a largest output color of 240, for example, or any other value that is appropriate for a particular application. Output color selections may be dependent on a particular print engine, printing system, print medium, or user preference for example.

A processor, such as processor 100 of FIG. 2 may be configured to compare the input level 34 with one or more preconfigured threshold values 36 associated with the output levels 36 or output colors 25. In one embodiment, the input level 34 is compared with at most two of the threshold values 36, where the input level 34 is preferentially weighted to select the output level 38 or output color 25 having an increased bit depth. The input level 34 may be weighted according to a magnitude of the associated input color range of pixel densities. In one embodiment, an output level associated with a color of zero pixel density, or OUT-0, is a default selection if the input level 34 is less than the threshold value 36 of one or more output levels 38 or output colors 25 to which the input level 34 is associated with. Comparing the input level 34 with a limited number of threshold values, such as two, can increase an error diffusion algorithm or processing speed.

As shown in FIG. 3, the input levels 34 may be associated with output levels 38 or output colors 25 representing pixel densities that are greater than the pixel density represented by the corresponding input color range 32. The selected output color 25 may include an increased pixel depth as compared to the pixel density of the associated input color range 32. To better understand how the output color 25 may be selected, the following example algorithm, or software code, is provided. The algorithm assumes a 4-bit data representation of the output color density.

```
1  sum = input_color + accumulated_error;
2  if (input_color > 95)
3  {
4      if (sum > th[15]) output_level = 15;
5      else output_level = 0;
6  }
7  else
8  {
9      input_level = get_in_level[input_color];
10     n = get_out_level[input_level];
11     if (sum > th[n]) output_level = n;
12     else if (sum > th[n-1]) output_level = n-1;
13     else output_level = 0;
14 }
```

The above algorithm may be executed by a processor, such as processor 100 of FIG. 2. The input_color provided at line 1 may include a variable that represents a tone or pixel density of the input color 20 of FIG. 2. The accumulated_error at line 1 may include an error value that is carried forward from a previous input color or pixel, according to an error diffusion algorithm known in the art. In one embodiment, the error diffusion algorithm includes the Floyd and Steinberg error filter. In other embodiments, error diffusion algorithms may be provided as described further in U.S. Pat. Nos. 6,496,603, 6,552,823 or 6,977,663.

At lines 2 through 8 of the algorithm, if the input color 20 is greater than 95 then it is identified as belonging in the input color range 96-255, further associated with input level IN-9. Input level IN-9 is associated with output level OUT-15 having an associated threshold value of 127. If the sum of the input color 20 and the accumulated error is greater than the threshold value of 127, then the output level OUT-15 is selected, which from FIG. 3 is shown as corresponding to an output color of 255. Otherwise, an output level of OUT-0 or output color of 0 is selected.

At line 9, if the input color 20 is 95 or less, then the input level 34 associated with the input color 20 is identified by finding the input color range 32 which includes the input color 20. For example, if the input color is 90, then the corresponding input level is IN-8, being associated with input color range 32 of between 88 and 95.

At line 10, the associated output levels 38 are determined according to the identified input level 34. For example, the input level 34 is associated with output levels OUT-15 and OUT-14, as depicted by color selection associations 35. The color selection 35 identified by a solid line may be understood as representing the variable "n" at line 10. For example, output level OUT-15 may be identified by the variable n.

At line 11, the sum of the input color 20 and the accumulated error is compared to a threshold value th[n] of the associated output threshold 36 of FIG. 3. If the sum is greater than th[n], then the associated output level 38 or output color 25 for n is selected. If the sum is less than th[n], then the sum is compared to a threshold value of the next lower sequential output level 38, identified by variable "n−1". Continuing the same example as previous, output level OUT-14 may be understood as being identified by the variable n−1. If the sum is greater than the threshold value th[n−1], then the associated output level 38 for n−1 is selected. If the sum is less than th[n−1], then an output level of zero or OUT-0 is selected.

Continuing the previous example, where th[n] is 127, corresponding to output level OUT-15, and th[n−1] is 119, corresponding to output level OUT-14, an example case study is provided as follows:

|  | pixel designation | | |
| --- | --- | --- | --- |
|  | A | B | C |
| input_color = | 90 | 90 | 90 |
| accumulated_error = | 0 | 30 | 40 |
| sum of color value = | 90 | 120 | 130 |
| output_level = | 0 | 14 | 15 |

Pixels A, B and C may include pixels in a print area representing a uniform input color or tone. Pixel A includes an input color having a pixel density of 90. Since pixel A is the first pixel, there is no accumulated error, shown as a zero value. The sum of the color value, or input color plus accumulated error of 90 and 0, is 90. Since the sum of 90 is less than both th[n]=127 and th[n−1]=119, the selected output level 38 is zero, or OUT-0.

Pixel B includes an input color also having a pixel density of 90. Since pixel A was not printed, there is an accumulated error that is distributed to its neighbors according to an error diffusion algorithm. In the example shown above, the accumulated error associated with pixel B is 30. The color value sum of 90 and 30 is 120. Since the sum of 120 is less than th[n]=127 but greater than th[n−1]=19, an output level OUT-14 is selected.

Pixel C includes an input color also having a pixel density of 90. Since pixel B was printed at output level OUT-14 having a greater pixel density than the input color 90, there is an accumulated error that is distributed to its neighbors according to an error diffusion algorithm. In the example shown above, the accumulated error associated with pixel C is 40. The sum of the color value is 130. Since the sum of 130 is greater than th[n]=127, an output level OUT-15 is selected. For print areas of uniform tone, there will be preferential selection of the higher output level associated with th[n], e.g. OUT-15, after the initial accumulated error is allowed to propagate through the neighboring pixels.

Pixels which are printed in isolation or do not include any nearby neighbors, may be regarding as being unstable, or unreliable. This is particularly true for pixels having a low tone or print density. Because of the nature of certain printers, dies and print media, a pixel may not adhere properly to a print medium where there is an insufficient amount of die or surface area to bond with the print medium, such as paper or film. In a multi-bit depth level environment, the darker tone pixels represent greater pixel depth or die content that are more likely to properly adhere to the print medium. Where an output level 38 is found to have poor or unreliable printing characteristics, it may be designated as being an unavailable output color selection. Output levels 38 or output colors 25 which do not correspond with or belong to any output threshold 36 may be determined through experimentation, and may be printer or application specific. In one embodiment, certain low density output colors 25, such as those including a single bit depth pixel, are designated as being non-selectable when representing an isolated pixel.

In one embodiment, the output colors 25 are printed at a print density or pixel depth that is approximately intermediate the corresponding output threshold 36. For example, output level OUT-14 may be printed at a print density of 115, 115 being the approximate intermediate value between the color range of 112 to 119. According to the algorithm associated with FIG. 3, the approximate intermediate pixel depth may be determined by taking the average of th[n] and th[n−1]. Different threshold values and output colors may be associated with the output levels 38 shown in FIG. 3, as FIG. 3 is meant to simply be an example data configuration that may be used in place of the lookup table 30 of FIG. 2

Figure 4:
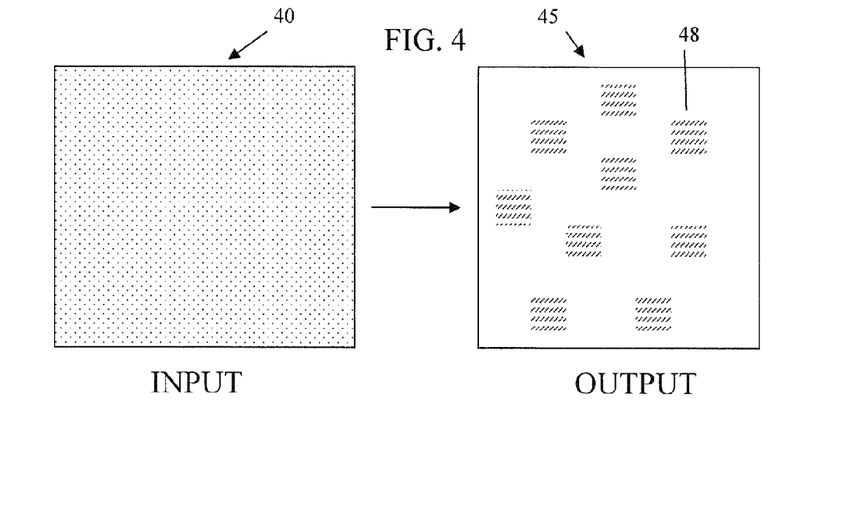
FIG. 4 illustrates an example process for reproducing a light tone.

FIG. 4 illustrates an example process for reproducing a light tone 40, which may be associated with input color 20 of FIG. 2, for example. The light tone 40 may represent an area of light tone input color. Utilizing the lookup table 30, an output color 45 may be selected. Output color 45 may include a print area comprised of multiple light tone pixels 48. Light tone pixels 48 may be considered to have a relatively low pixel depth density. The light tone pixels 48 may be selected from output levels 38 or output colors 25 such that they are associated with one of the input levels 34 of FIG. 3.

In one embodiment, the output levels 38 or output colors 25 associated with at least one of the input levels 34 are determined to provide stable pixels, even when printed as isolated pixels on a print medium. In this manner, none of the light tone pixels 48 may be wiped away or dispersed during a printing process. In addition, by utilizing an output color selection algorithm such as one described with respect to FIG. 3, a preferential selection of the same or similar tone pixels may be selected throughout a print area including output color 45. Selecting uniform density light tone pixels can improve the visual perception of a highlight or light colored area and reduce the graininess that is associated with conventional systems that utilize pixels having different tones or density.

Figure 5:
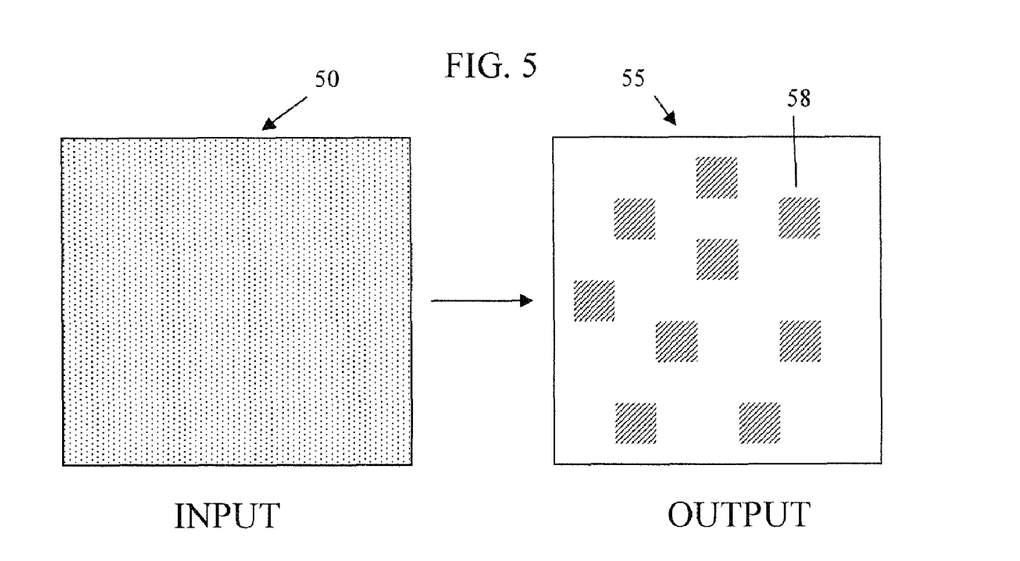
FIG. 5 illustrates an example process for reproducing a mid tone.

FIG. 5 illustrates an example process for reproducing a mid tone 50, which may be associated with input color 20 of FIG. 2, for example. The mid tone 50 may represent an area of mid tone input color. Utilizing the lookup table 30, an output color 55 may be selected. Output color 55 may include a print area comprised of multiple mid tone pixels 58. Mid tone pixels 58 may be considered to have a moderate pixel depth density. The mid tone pixels 58 may be selected from output levels 38 or output colors 25 such that they are associated with one of the input levels 34 of FIG. 3.

Figure 6:
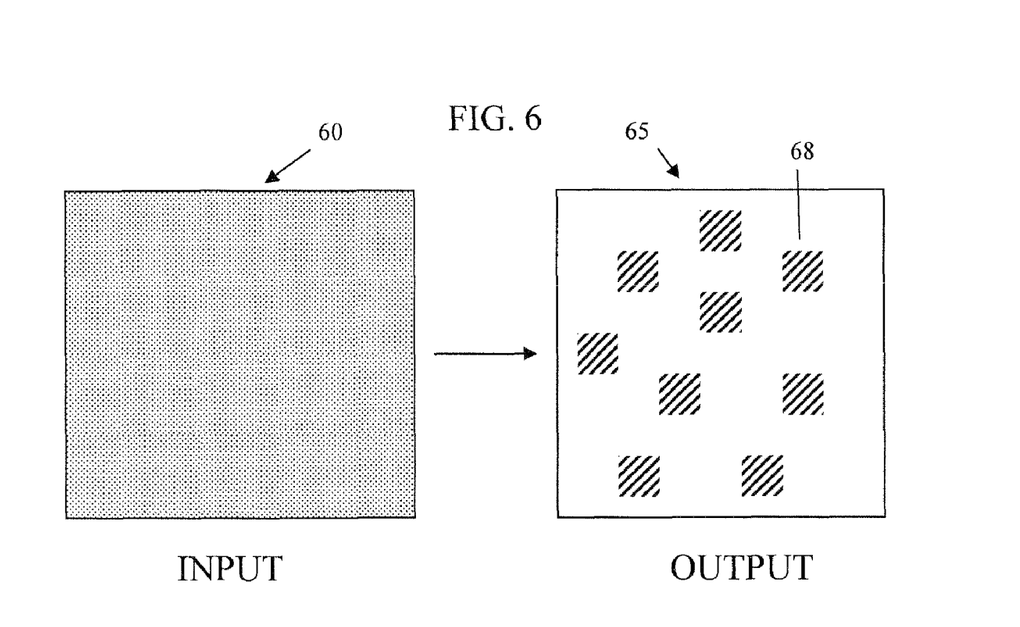
FIG. 6 illustrates an example process for reproducing a dark tone.

FIG. 6 illustrates an example process for reproducing a second color tone 60, which may be associated with input color 20 of FIG. 2, for example. The second color tone 60 may represent an area of dark tone input color. Utilizing the lookup table 30, an output color 65 may be selected. Output color 65 may include a print area comprised of multiple dark tone pixels 68. Dark tone pixels 68 may be considered to have a high pixel depth density. The dark tone pixels 68 may be selected from output colors 38 in the lookup table 30 such that they are associated with at least one of the input levels 34 of FIG. 3. In one embodiment, the dark tone pixels 68 are preferentially selected as the output level 38 or output color 25 having a maximum pixel density, such as output color OUT-15 of FIG. 3.

By utilizing an output color selection algorithm such as one described with respect to FIG. 3, a preferential selection of the same or similar tone pixels may be selected throughout a print area of the output color 65. By representing an input color 20 or color tone 50, 60 by the same or similar tone pixels, a total number of pixels used may be less than a process or algorithm which represents the input color 20 using different tone pixels. Minimizing a number of output pixels reduces dot gain in the output colors 55, 56 by tending to avoid closely neighboring pixels. In addition, selecting uniform density dark tone pixels can improve the visual perception of a dark colored area and produce a cleaner and crisper image as compared with conventional systems that utilize pixels having different tones or density.

FIGS. 4, 5 and 6 may represent pixel densities associated with a multi-tone output color selection algorithm. In one embodiment, the algorithm utilizes a 2-bit color selection algorithm, where FIG. 4 is associated with a 2-bit value of 1, FIG. 5 is associated with a 2-bit value of 2, and FIG. 6 is associated with a 2-bit value of 3. Multi-tone output color selection algorithms represented by 4-bit or 8-bit color values could similarly be represented by a larger number of color conversion processes similar to FIGS. 4, 5 and 6. In one embodiment, one or more of the lowest color values are not selected by the multi-tone output color selection algorithm.

Figure 7:
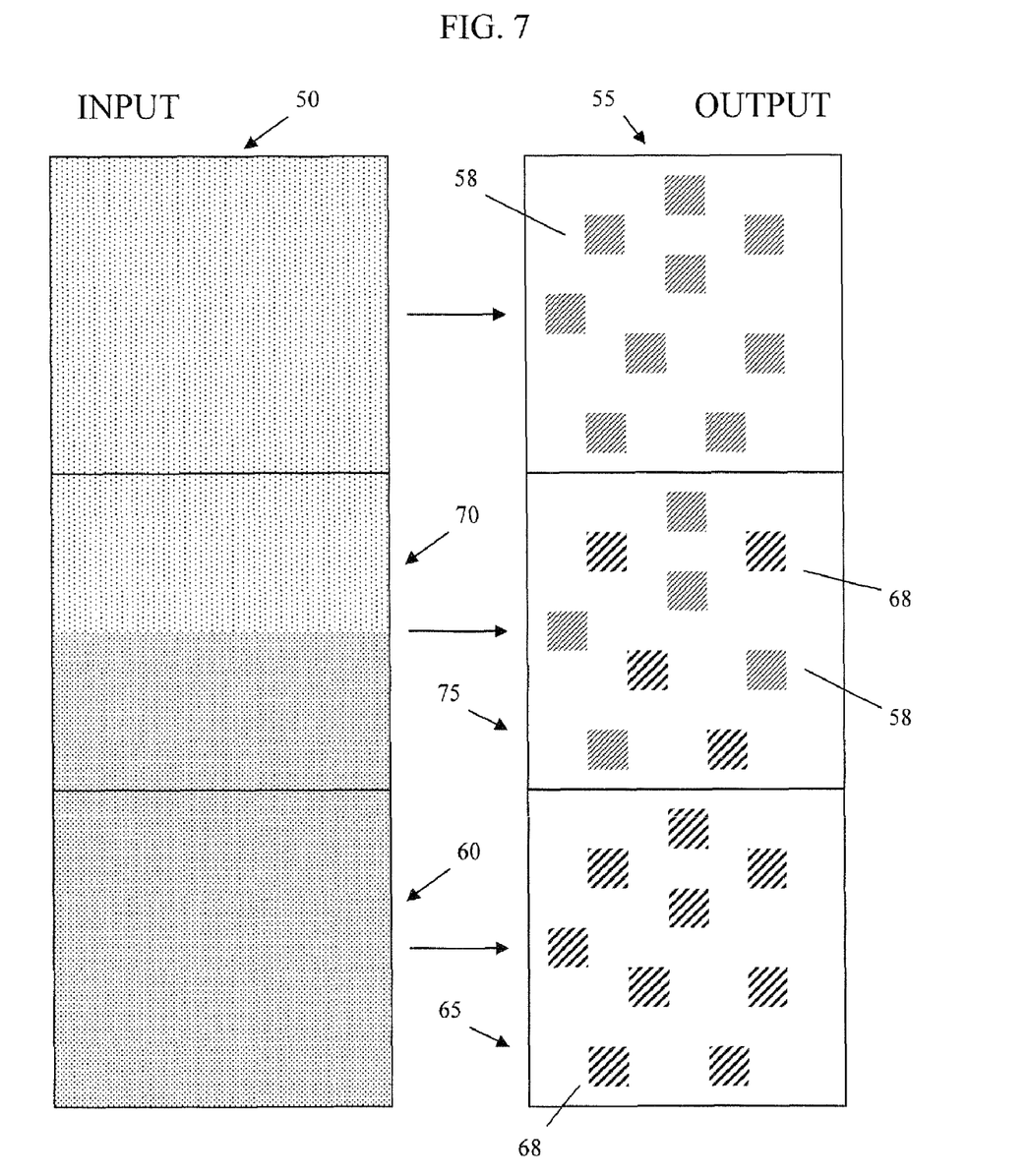
FIG. 7 illustrates an example process for reproducing a first color tone and a second color tone, including a transition area.

FIG. 7 illustrates an example process for reproducing a first color tone and a second color tone such as mid and dark tones 50, 60 of FIGS. 5 and 6, including a transition area 70. As described with respect to FIGS. 5 and 6, a preferential selection of the same or uniform tone pixels, such as pixel 58 or pixel 68 may be selected for output colors 55 and 65.

Utilizing the lookup table 30, an output color 75 may be selected to represent the color input or tone of transition area 70. Output color 75 may include a print area comprised of multiple mid tone pixels 58 as well as multiple dark tone pixels 68. The mid and dark tone pixels 58, 68 may be selected from output levels 38 or output colors 25 of FIG. 3 such that they are associated with at least one of the input levels 34. In one embodiment, the mid and dark tone pixels 58, 68 are preferentially selected from the output levels 38 or output colors 25. By utilizing an output color selection algorithm such as one described with respect to FIG. 3, a preferential selection of same or similar tone pixels may be selected throughout a print area of the output color 65.

The processor 100 of FIG. 2 may be configured to select a first output level, such as pixel 58, for a first print area, such as output color 55. The processor 100 may be configured to select a second output level, as pixel 68, for a second print area, such as output color 65. The processor 100 may be further configured to select the first and second pixels 58, 68 for a transition area, such as output color 75, interposed between the first and second output colors 55, 65.

Figure 8:
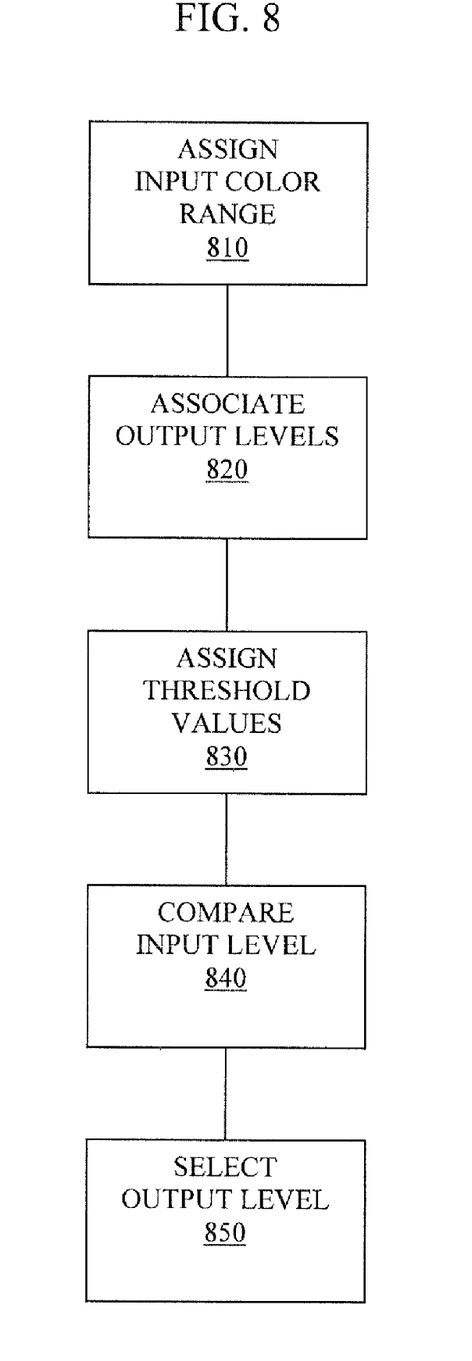
FIG. 8 illustrates an example operation for selecting an output level.

FIG. 8 illustrates an example operation for selecting an output level, such as one of the output levels 38 or output colors 25 of FIG. 3. The operation may be provided as a method of operation or logic encoded in one or more tangible media, such as software or firmware. The method or logic may be executed by a processor, such as processor 100 of FIG. 2.

At operation 810, a range of image densities, such as input color range 32 of FIG. 3, is assigned to an input level, such as input level 34, in a lookup table 30. The input color range 32 identifying a range of image pixel densities may be assigned to the input level in a non-uniform manner, such that one of the input levels 34 may be assigned a range that is larger than another input level.

At operation 820, the input level 34 is associated with one or more output levels, such as output level 38 or output color 25 of FIG. 3, representing a print density. The output level 38 or output color 25 may be defined as including a multi-bit output level.

At operation 830, a threshold value is assigned to each of the one or more output levels 38 or output colors 25. The threshold value, such as output threshold 36, may identify a minimum value of output level or output color selection. In one embodiment, the output levels 38 or output colors 25 are separated by uniformly spaced threshold values. In one embodiment, an output threshold value may be associated with a pixel density which is larger than any other pixel density associated with other output threshold values 36. For example the output threshold 36 associated with the output level OUT-15 of FIG. 3 may be understood as identifying a range of pixel densities or print densities of between 128 and 255, whereas the output threshold 36 associated with the output level OUT-14 may include a pixel density range of between 120 and 127.

Output level 38 or output color 25 may be selected according to a comparison of the input level 34 with one or more threshold values of the output threshold 36. In one embodiment, the input level 34 of FIG. 3 or input color 20 of FIG. 2 is adjusted according to an error filter prior to comparing the input level 34 or input color 20 with the threshold output value. In one embodiment, the input level 34 or input color 20 is compared with at most two threshold values of the output threshold 36. 11. A print output level 38 or output color 25 of zero print density may be selected when the input level 34 or output color 20 is less than the at most two threshold values.

The reproduction of the an image including the input level 34 may result in a preferential selection of one of the output levels 38 or output colors 25 having a greater print density than the image pixel density associated with the input color range 32 or input level 34. In one embodiment, a single multi-bit output level may be selected for a print area associated with a uniform tone or grey level to minimize a number of pixels printed in the print area.

Figure 9:
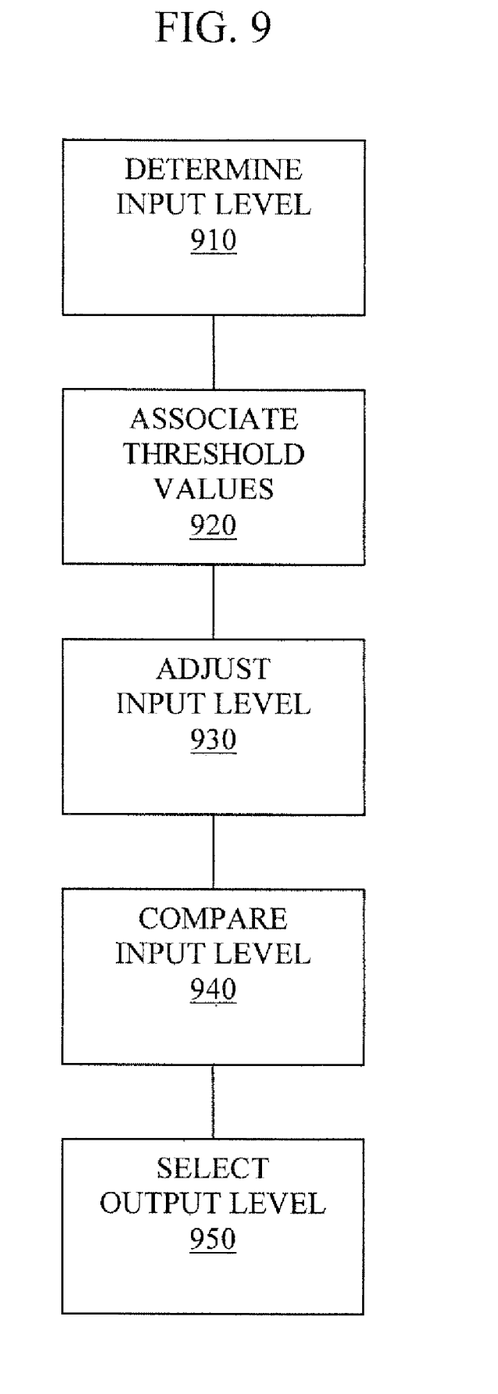
FIG. 9 illustrates a further example operation for selecting an output level.

FIG. 9 illustrates a further example operation for selecting an output level. The operation may be provided as a method of operation or logic encoded in one or more tangible media, such as software or firmware. The method or logic may be executed by a processor, such as processor 100 of FIG. 2.

At operation 910, an image input level, such as input color 20 of FIG. 1 is determined. At operation 920, the image input level is associated with one or more threshold output values. The threshold output values may be associated with an output threshold range, such as output threshold 36 of FIG. 3. The output threshold 36 may identify an output level such as output level 38 or an output color, such as output color 25. In one embodiment, the output level 38 defines a multi-bit output level or multi-bit output color. At least one of the output levels 38 may not be identified by any of the one or more threshold output levels. In one embodiment, the image input level is associated with exactly two threshold values or multi-bit output levels to avoid image contouring.

At operation 930, the image input level is adjusted, such as by error diffusion. The error diffusion may include a computation, algorithm or filter, such as the Floyd and Steinberg error filter.

At operation 940, the adjusted image input level is compared with the one or more threshold output levels. In one embodiment, the adjusted image input level is compared with at most two threshold output values before selecting the output level.

At operation 950, an output level, such as one of the output levels 38 of FIG. 3 is selected. In one embodiment, a zero output level is selected if the adjusted image input level is less than the one or more threshold output values. In another embodiment, the selected output level produces a darker tone or grey level than the image input level. A single output level may be preferentially selected for a print area associated with a uniform grey level to minimize a number of pixels printed in the print area.

It should be appreciated that any reference to color, color range or color level in this specification is equally applicable to monochromatic images. Similarly, it should be appreciated that any reference to monochrome, grayscale or grey levels in this specification is equally applicable to color images.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A non-transitory computer-readable medium having stored thereon computer-executable instructions that, in response to execution by a computing system, cause the computing system to perform operations comprising:
   determining an image input level;
   associating the image input level with one or more threshold output values which identify a plurality of printer output levels including a first printer output level;
   adjusting the image input level by error diffusion;
   comparing the adjusted image input level with the one or more threshold output values; and
   selecting a printer output level in response to comparing the adjusted image input level with the one or more threshold output values, wherein the first printer output level is selected for a first print area when the adjusted input level is greater than the one or more threshold output values, wherein a second printer output level is selected for a second print area when the adjusted image input level is less than the one or more threshold output values, and wherein the first and second printer output levels are selected for a transition area interposed between the first and second print areas.

2. The computer-readable medium according to claim 1, wherein the image input level is associated with exactly two of the multi-bit output levels, and wherein the adjusted input level is compared to two threshold output values corresponding to the two multi-bit output levels prior to selecting the second printer output level.

3. The computer-readable medium according to claim 1, wherein the second printer output level comprises a zero printer output level.

4. The computer-readable medium according to claim 1, wherein the first printer output level produces a darker grey level than the image input level.

5. The computer-readable medium according to claim 1, wherein the operations including comparing the adjusted image input level further comprise comparing the adjusted image input level with two of the threshold output values associated with the image input level before selecting the printer output level.

6. The computer-readable medium according to claim 1, wherein the operations further comprise preferentially selecting a single printer output level for a print area associated with a uniform grey level to minimize a number of pixels printed in the print area.

7. The computer-readable medium according to claim 5, wherein the operations further comprise taking an average value of the two threshold output values, and wherein the printer output level is selected as the average value.

8. The computer-readable medium according to claim 1, wherein the one or more threshold output values comprise a first threshold output value and a second threshold output value, and wherein the operations comprising comparing the adjusted image input level with the one or more threshold output values includes:
   comparing the adjusted image input level with the first threshold output value, wherein the first printer output level is selected when the adjusted input level is greater than the first threshold output value; and
   comparing the adjusted image input level with the second threshold output value, wherein the second printer output level is selected when the adjusted input level is greater than the second threshold output value.

9. The computer-readable medium according to claim 1, wherein the second printer output level is not identified by any of the one or more threshold output values.

10. A method, comprising:
    determining an image input level;
    associating the image input level with one or more threshold output values which identify a plurality of printer output levels including a first printer output level;
    adjusting, with a processing device, the image input level by error diffusion;
    comparing the adjusted image input level with the one or more threshold output values;
    selecting a printer output level in response to comparing the adjusted image input level with the one or more threshold output values, wherein the first printer output level is selected when the adjusted input level is greater than the one or more threshold output values, and wherein a second printer output level is selected when the adjusted image input level is less than the one or more threshold output values; and,
    taking an average value of two or more of the threshold output values, wherein the printer output level is selected as the average value.

11. The method according to claim 10, wherein the first printer output level comprises a multi-bit depth pixel.

12. The method according to claim 10, wherein the first printer output level comprises a single bit depth pixel.

13. The method according to claim 10, wherein the image input level is compared with at most two of the threshold output values before selecting the second printer output level.

14. The method according to claim 13, wherein the second printer output level is zero.

15. The method according to claim 10, wherein the image input level is associated with a range of input pixel densities, and wherein the image input level is weighted according to a magnitude of the range of input pixel densities.

16. The method according to claim 10, wherein the second printer output level is not identified by any of the one or more threshold output values.

17. An apparatus, comprising:
    means for determining an image input level;
    means for associating the image input level with one or more threshold output values which identify a plurality of printer output levels including a first printer output level;
    means for adjusting the image input level by error diffusion;
    means for comparing the adjusted image input level with the one or more threshold output values; and
    means for selecting a printer output level in response to comparing the adjusted image input level with the one or more threshold output values, wherein the first printer output level is selected when the adjusted input level is greater than the one or more threshold output values, wherein a second printer output level is selected when the adjusted image input level is less than the one or more threshold output values, and wherein the printer output level is selected for a print area associated with a substantially uniform grey level to minimize a number of pixels printed in the print area.

18. The apparatus according to claim 17, further comprising means for assigning a non-uniform range of image pixel densities to a look-up table, wherein the non-uniform range of image pixel densities is assigned to the image input level when the non-uniform range comprises a maximum pixel density larger than any other range in the look-up table.

19. The apparatus according to claim 17, wherein the image input level is compared with two of the threshold output values in selecting the printer output level.

20. The apparatus according to claim 19, wherein the second printer output level has a value of zero.

21. The apparatus according to claim 17, wherein the image input level is adjusted according to an error filter prior to comparing the adjusted image input level with the one or more threshold output values.

22. The apparatus according to claim 17, wherein the one or more threshold output values comprises a first threshold output value and a second threshold output value, wherein the means for associating comprises means for associating the image input level with the first threshold output value and the second threshold output value, and wherein the means for selecting comprises means for selecting the printer output level as an average value of the first threshold output value and the second threshold output value.

23. The apparatus according to claim 17, wherein the second printer output level is not identified by any of the one or more threshold output values.

24. A method, comprising:
determining an image input level;
associating the image input level with one or more threshold output values which identify a plurality of printer output levels including a first printer output level;
adjusting the image input level by error diffusion;
comparing the adjusted image input level with the one or more threshold output values; and
selecting a printer output level from the plurality of printer output levels in response to comparing the adjusted image input level with the one or more threshold output values, wherein the first printer output level is selected when the adjusted input level is greater than the one or more threshold output values, wherein a second printer output level is selected when the adjusted image input level is less than the one or more threshold output values, and wherein at least one of the plurality of printer output levels other than zero is not associated with any threshold output value.

* * * * *